Oct. 12, 1965    R. V. WHITE    3,211,166
LIQUID ADDITIVE APPARATUS
Filed Sept. 24, 1963    2 Sheets-Sheet 2
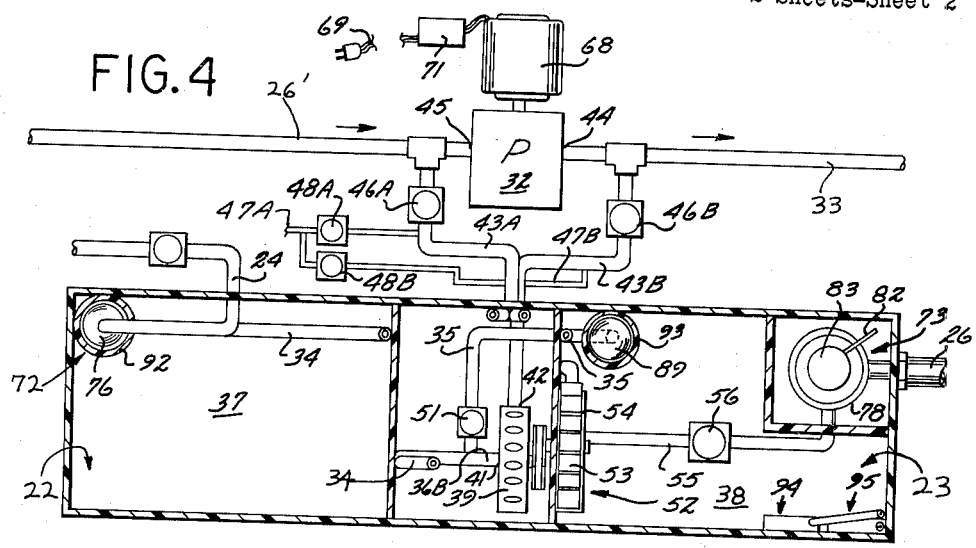
FIG. 4
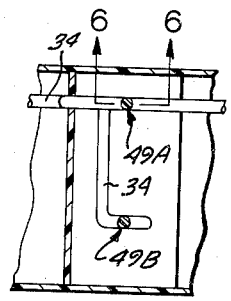
FIG. 5
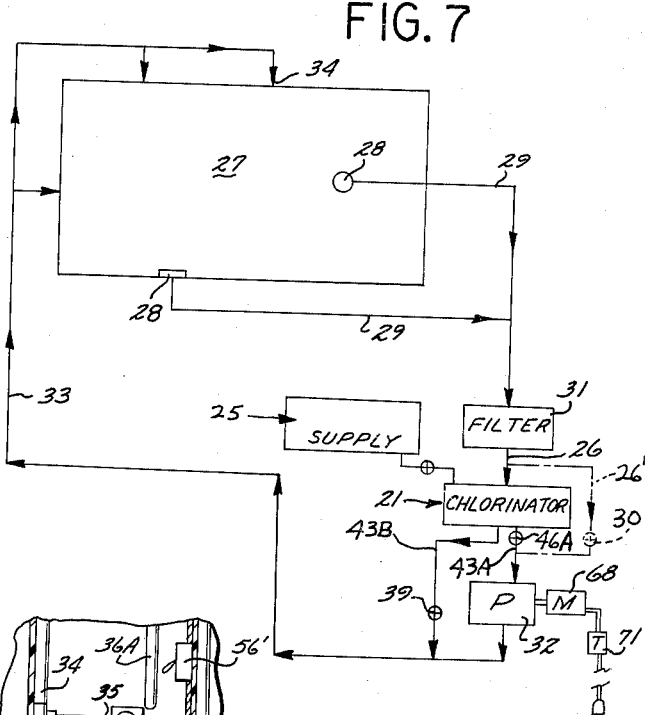
FIG. 7
FIG. 6
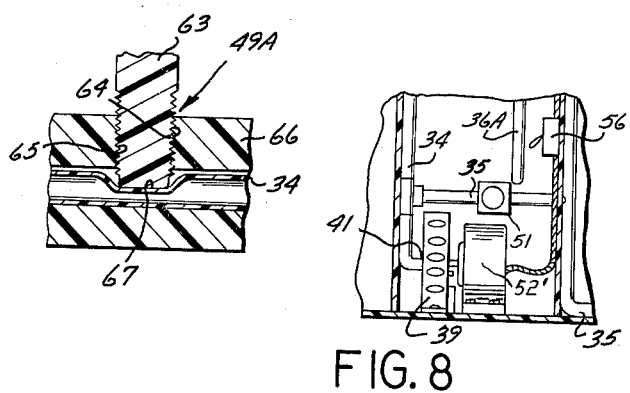
FIG. 8
INVENTOR.
REX V. WHITE United States Patent Office 3,211,166
Patented Oct. 12, 1965

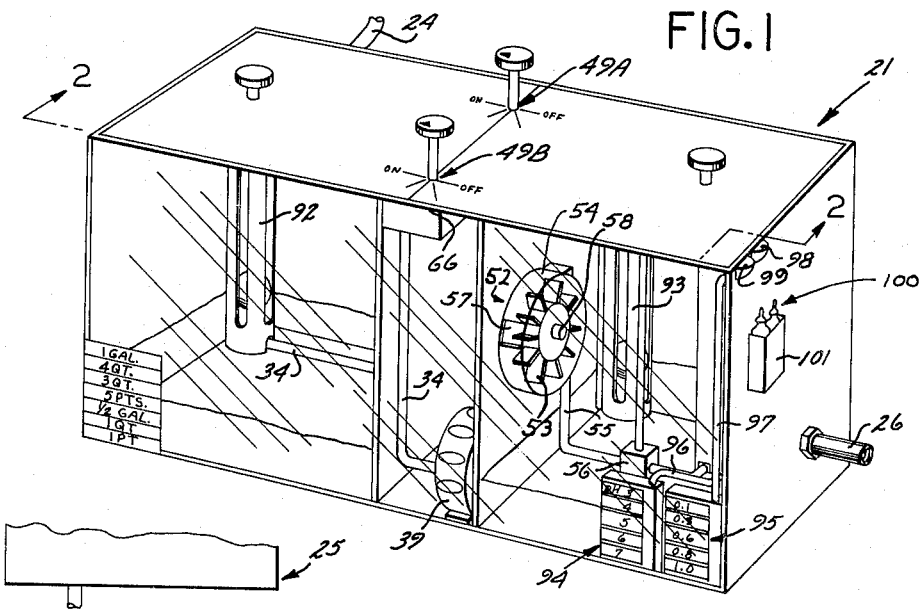
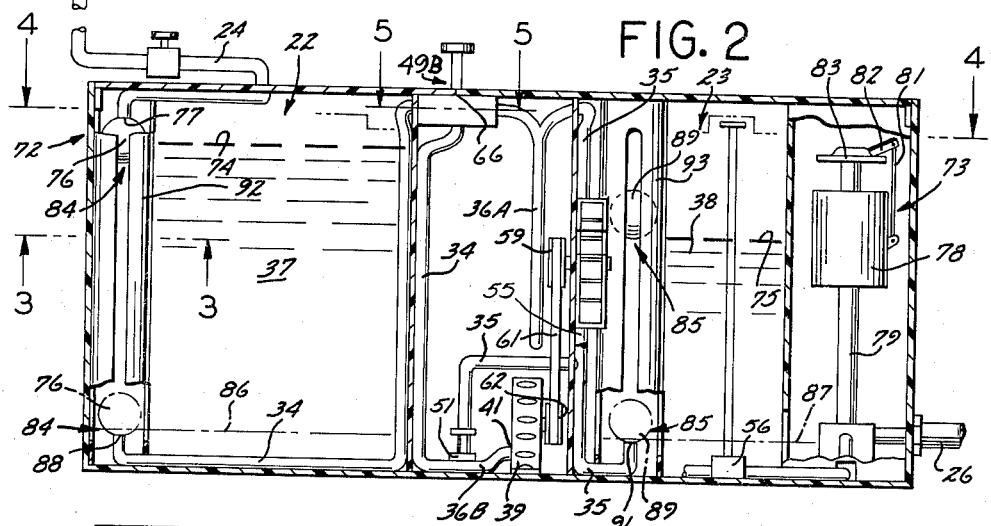
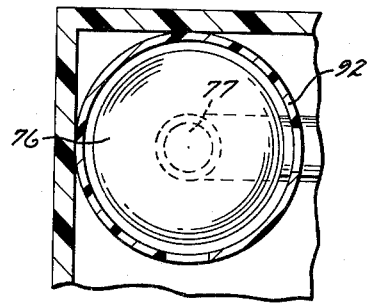

3,211,166
LIQUID ADDITIVE APPARATUS
Rex V. White, 2048 S. La Cienega Blvd., Apt. 1,
Los Angeles, Calif.
Filed Sept. 24, 1963, Ser. No. 311,085
6 Claims. (Cl. 137—99)

Generally speaking, the present invention relates to liquid additive apparatus adapted for use in adding a first liquid to a second liquid in a desired ratio and, more particularly, one preferred exemplary form of the invention pertains to chlorinating apparatus for adding a concentrated chlorine-containing liquid to a larger quantity of circulating swimming pool water in a desired ratio (which is preferably controllably adjustable) and also adapted to effectively mix said concentrated chlorine-containing liquid and said swimming pool water together whereby to effectively provide a desired concentration of chlorine in the swimming pool water for antiseptic purposes as is customary in swimming pool water.

However, it should be clearly noted that the apparatus is not specifically limited to the above-mentioned specific preferred form of the invention, although it does comprise a highly effective form of the invention which provides a compact and self-contained type of chlorinator unit which can be readily connected in circuit with a much larger quantity of swimming pool water and which will be operable over a long period of time without maintenance or personal inspection being required and which will effectively maintain a required concentration of chlorine in the swimming pool water in a manner which is greatly superior, more effective, more uniform, and simpler as to the size, complexity and cost of the apparatus required for doing same, than conventional prior art systems for chlorinating swimming pool water. Therefore, the present invention will be described throughout this application primarily with reference to such a specific form thereof wherein it comprises chlorinating apparatus for swimming pool water. However, it is to be clearly understood that this is exemplary only and is to be construed in a non-limiting sense.

In connection with the above, it should be noted that various prior art chlorinating apparatuses and procedures have been invented and developed heretofore and are employed as conventional prior art equipment and practices. For example, various large mixing chambers wherein chlorine-containing liquid and water can be mixed (either power mixed or hand mixed) and then fed into the swimming pool water have been invented and developed heretofore and have been frequently employed in conventional prior art practice for this purpose. Also, in certain cases, chlorine-containing concentrate has been otherwise added to the swimming pool water by various different techniques and/or apparatus. However, most of these prior art apparatuses and techniques have involved what might be called "batch type" processes wherein relatively large quantities of chlorine-containing concentrate are added to the swimming pool water at a particular time and then substantial periods of time elapse before the next such operation occurs. This results in causing too high a concentration of chlorine in the swimming pool water initially immediately after such an operation and too low a concentration of chlorine in the swimming pool water just before the next such chlorinating operation. In other words, such prior art techniques and apparatuses have all of the defects inherent in all of such batch type operations as opposed to so-called "continuous flow" type operations.

Furthermore, most prior art apparatuses have been relatively large, costly, complex, and difficult to handle.

However, it should be clearly noted that the apparatus of the present invention is of what might be termed a "continuous flow type" adapted to continually add the chlorine-containing concentrate in a desired and usually controllably adjustable ratio with respect to the swimming pool water whenever said water is being re-circulated by a conventional pump whereby to maintain an optimum concentration of chlorine in the swimming pool water at all times. This produces ideal sanitation conditions in the swimming pool water and actually minimizes the expense involved in chlorinating such swimming pool water.

Furthermore, it should be noted that the apparatus of the present invention is a very small, simple, easy-to-install, easy-to-operate, relatively inexpensive, virtually foolproof, chlorinating apparatus which is self-operating over substantial periods of time and which will require little or no maintenance or inspection by the owner of a swimming pool, or swimming pool maintenance personnel, in the undesirable manner of certain types of prior art chlorinating apparatuses and equipments.

With the above points in mind, it is an object of the present invention to provide novel liquid additive apparatus for adding a first liquid to a second liquid in a desired ratio.

It is a further object of the present invention to provide additive apparatus of the character referred to in the preceding object, wherein said desired ratio is controllably adjustable and wherein the apparatus also acts to effectively mix the two liquids together.

It is a further object of the present invention to provide liquid additive apparatus of the character referred to hereinbefore which, in one specific preferred form, comprises chlorinating apparatus for adding a chlorine-containing concentrate to a larger quantity of swimming pool water or the like in a desired ratio (which is usually controllably adjustable) and for effectively mixing same together in what might be termed a "continuous flow type" of process which produces optimum sanitizing of the swimming pool water at minimum expense for the chlorine-containing concentrate and also for the apparatus involved.

It is a further object of the present invention to provide novel chlorinating apparatus of the character referred to hereinbefore, which is arranged to become automatically operative whenever a conventional circulating main pump for the swimming pool water becomes operative and which is arranged to become inoperative when said main swimming pool pump becomes inoperative. In other words, the apparatus of the present invention does not require separate operating and/or control means and does not operate independently of the main swimming pool pump. This minimizes the cost and complexity of the apparatus and, furthermore, makes it virtually maintenance-free since the main swimming pool pump is usually clock-controlled or otherwise automatically controlled for operation at various time cycles and this will also control the operation of the novel chlorinating apparatus of the present invention, which is additionally provided with valving so arranged as to prevent the complete emptying of the chlorinating apparatus which would otherwise require that the main swimming pool water pump be primed before it can again be satisfactorily operated (except in those arrangements where the pump itself might be of a self-priming type).

It is a further object of the present invention to provide novel chlorinating apparatus of the character referred to hereinbefore which is arranged for adding the chlorine-containing concentrate to the circulating swimming pool water either on the inflow, suction or low pressure side or on the outflow or high pressure side of a conventional circulating main pump for the swimming pool water, or which is capable of adding any other desired additive liquid with respect to water or the like in the same manner—that is, at either high pressure or low pressure portions of a hydraulic circuit connected to said larger quantity of water or the like.

It is a further object of the present invention to provide apparatus of the character referred to hereinbefore, embodying any or all of the features referred to hereinbefore, either generically or specifically, individually or in combination, and which is of relatively simple, inexpensive, easy-to-install, easy-to-operate construction capable of mass manufacture at relatively low cost and which requires a minimum of maintenance and supervision whereby to be conducive to widespread usage thereof.

Further objects are implicit in the detailed description which follows hereinafter (which is to be considered as exemplary of, but not specifically limiting the present invention) and said objects will be apparent to persons skilled in the art after a careful study of the detailed description which follows hereinafter.

For the purpose of clarifying the nature of the present invention, two exemplary embodiments of the invention are illustrated in the hereinbelow-described figures of the accompanying two drawing sheets and are described in detail hereinafter.

FIG. 1 is a reduced-size, perspective view of one exemplary embodiment of the apparatus of the present invention wherein it is shown as comprising a chlorinating apparatus for adding a chlorine-containing concentrate liquid to a larger quantity of circulating swimming pool water or the like.

FIG. 2 is a fragmentary view, partly in section and partly in elevation, taken substantially along the staggered plane indicated by the arrows 2—2 of FIG. 1.

FIG. 3 is a larger-scale fragmentary, sectional view, taken in the direction of the arrows 3—3 of FIG. 2 and illustrates the liquid-level-responsive float valve means controlling the flow of chlorine-containing concentrate liquid into the chlorine-liquid-containing chamber.

FIG. 4 is a top view, partly comprising a top plan view with parts being shown in elevation, and partly comprising a sectional view, taken in the direction of the arrows 4—4 of FIG. 2, with a portion of the hydraulic circuit and motor and pump means for pumping the swimming pool water being additionally shown in this view.

FIG. 5 is a fragmentary view, partly in section, taken in the direction of the arrows 5—5 of FIG. 2 and illustrates the outflow or outlet duct means from the first and second chambers of the apparatus and the controllably operable valve means cooperating therewith for controllably adjusting the ratio of the feeding of the chlorine-containing liquid concentrate to the swimming pool water.

FIG. 6 is an enlarged fragmentary sectional view, taken in the direction of the arrows 6—6 of FIG. 5 and illustrates a typical one of the controllably adjustable valve means.

FIG. 7 is a schematic view illustrating the hydraulic circuit of one exemplary system embodying the chlorinating apparatus of the present invention in circuit with a larger quantity of swimming pool water for effectively chlorinating same in a desired optimum manner. This view illustrates an optional swimming pool water partial by-pass path in phantom lines.

FIG. 8 is a fragmentary view illustrating a modified driving motor means for driving the auxiliary pump means.

Generally speaking, the liquid additive apparatus of the present invention comprises housing means, such as generally indicated at 21, defining first and second chamber means therein, as generally indicated at 22 and 23, with said first chamber means 22 being provided with inflow or inlet conduit means 24 thereinto and being adapted to be connected to a self-feeding supply means adapted to contain a quantity of a first additive liquid such as a chlorine-containing liquid concentrate or the like, although not specifically so limited. Said supply means is generally indicated at 25 in FIGS. 2 and 7.

The above-mentioned second chamber means 23 is also provided with inflow or inlet conduit means 26 adapted to be connected to a self-feeding supply means for supplying a larger quantity of a second liquid, such as swimming pool water or the like, although not specifically so limited.

It should be noted that in the exemplary form of the invention illustrated, wherein the liquid additive apparatus is shown as comprising chlorinating apparatus, said second-mentioned self-feeding supply means may be said to comprise the water-containing swimming pool, which is designated by the reference numeral 27 in FIG. 7, which normally emits water through one or more drain aperture means 28 and drain conduit means 29 for passage through a filter means 31 and into the hereinbefore-mentioned inlet or inflow conduit means 26 which supplies and feeds water into said second chamber 23 of the chlorinator 21. A portion of the swimming pool water passes through a partial by-pass conduit means 26' extending around the chlorinator 21 to any desired degree as determined by the adjustment of valve means 30.

The feeding action of said water through said inlet or inflow conduit means 26 into said second chamber 23 of the chlorinator 21 may, in certain cases, occur as a result of gravity flow, although it usually occurs primarily because the swimming pool 27 merely comprises a part of a hydraulic circuit including the drain outlets 28, drain conduits 29, filter 31, inflow conduit means 26, by-pass conduit means 26', chlorinator 21, main pump 32, and conduit means 33 connected from the high pressure side 44 of the main pump 32 to one or more inflow means 40 communicating with the interior of the swimming pool 27. In other words, the action of the main pump 32 causes circulation of the swimming pool water and, in effect, can be said to cause the above-mentioned self-feeding action of the above-mentioned self-feeding supply means supplying said water to said inlet or inflow conduit means 26.

In the exemplary form of the invention illustrated, said first and second chambers 22 and 23 are provided with outflow conduit means 34 and 35, respectively, which connect with common outflow duct means 36A and 36B which are adapted to be connected to the suction or low pressure side of pumping means for sucking the first additive liquid, such as the chlorine-containing concentrate shown at 37 in the first chamber 22, and the second liquid, such as the portion of the swimming pool water shown at 38 in said second chamber 23, through said common outlet duct means (comprising elements 36A and/or 36B) in a desired controllably adjustable ratio with respect to each other for subsequent mixing thereof and pumping thereof by said pumping means through the high pressure conduit means 33 toward the swimming pool 27.

It should be noted that the above generically-referred-to pumping means may be said to comprise the previously mentioned main swimming pool circuit pump 32, per se, or may be said to comprise said main swimming pool pump 32 in combination with an auxiliary pump 39 which is connected in parallel with respect to the main swimming pool pump 32 and has its inlet or low pressure side 41 connected to the common outlet duct 36B of the chlorinator 21 and which has its outlet or high pressure side 42 connected by the duct means 43B to the outlet or high pressure side 44 of the main swimming pool pump 32.

Said other common outlet duct portion 36A is connected by a duct 43A to the low pressure inlet side 45 of said main swimming pool pump 32.

Each of said ducts 43A and 43B is provided with controllably operable valve means 46A and 46B, respectively, for controlling flow therethrough and each of said ducts 43A and 43B may be provided with acid adding conduit means 47A and 47B and controllable valve means 48A and 48B, respectively, for controllably adding acid to the chlorine-water solution.

The exemplary form of the chlorinator 21 illustrated is provided with ratio-controlling means for controlling the ratio of said first and second liquids 37 and 38 (which may comprise chlorine-containing liquid concentrate and swimming pool water, respectively) drawn from said first and second chambers 22 and 23 through the outlet conduits 34 and 35 thereof into said common outlet duct means, such as shown at 36A and/or 36B.

In the exemplary form of the invention illustrated said ratio controlling means comprises a first controllably adjustable metering valve means 49A connected in the outlet duct means 34 between said first chamber 22 and said common outlet duct means 36A–36B and a second controllably adjustable metering valve means indicated generally at 49B also connected between said first chamber 22 and said common outlet duct means 36A–36B.

It will be understood that operation of the valve means 49A will control flow of the chlorine-containing liquid concentrate 37 into the common outlet duct means 36A which connects to the hereinbefore-mentioned outlet duct 43A and which then connects through the control valve 46A to the inlet or low pressure side 45 of the main swimming pool pump 32.

It will also be understood that operation of the valve means 49B will control flow of the chlorine-containing liquid concentrate 37 into the common outlet duct means 36B which connects to the inlet or low pressure side 41 of the auxiliary pump 39 and then is fed from the outlet or high pressure side 42 of said auxiliary pump 39 through the before-mentioned outlet duct 43B and the before-mentioned control valve 46B to the outlet or high pressure side 44 of the main pump 32.

In each case, water 38 is fed from the second chamber 23 through the corresponding outlet duct portions 35 in an unvalved manner for mixing with the controllably adjusted quantities of chlorine-containing concentrate 37 in the corresponding outlet duct portions 36A or 36B whereby to produce a desired concentration of chlorine in the swimming pool water and whereby to produce effective mixing of same as they pass through the pumping means.

The outlet conduit portion 35 carrying swimming pool water to the low pressure inlet side 41 of the auxiliary pump 39 is also provided with control valve means, as indicated at 51. This makes it possible to completely shut off said outlet conduit portion, if desired, which would normally occur at the same time that the valve means 49B is also closed or shut off. When this occurs, no liquid is pumped by the auxiliary pump means 39 through the outlet duct 43B and valve 46B to the outlet or high pressure side 44 of the main pump 32 and, if desired, said valve 46B may also be closed. When the apparatus is so arranged, the entire mixture of chlorine-containing concentrate 37 and swimming pool water 38 from the first and second chambers 22 and 23 is drawn through the common outlet duct portion 36A and the outlet duct 43A connected thereto and through the open valve 46A to the inlet or low pressure side 45 of the swimming pool pump 32.

In those instances when it may be desired to provide any desired portion of the mixture of chlorine-containing concentrate 37 and swimming pool water 38 to the outlet or high pressure side 44 of the swimming pool pump 32, this can be accomplished by opening the valves 49B, 51 and 46B, and by closing valves 49A and/or 46A to any desired degree or completely, if desired, in certain instances. This will cause chlorine-containing concentrate 37 and the swimming pool water 38 to be fed through the common outlet duct means portion 46B and to the inlet side 41 of the auxiliary pump 39 and from the outlet side 42 thereof through the previously mentioned outlet duct 43B and valve 46B to said outlet or high pressure side 44 of the main pump 32.

It should be noted that it may be desirable under some circumstances to feed chlorine and water solution produced as a result of operation of the present invention through both of the outlet ducts 43A and 43B and valves 46A and 46B to both the inlet and outlet sides 45 and 44 of the main pump 32. This may be in any desired ratio ranging from zero to maximum values with respect to either side of the main pump 32 and, in certain cases, the complete feed of the solution of chlorine-containing concentrate and swimming pool water may be fed to either said low pressure side 45 or to said high pressure side 44 of said main pump 32, if desired.

It should be noted that said auxiliary pump 39 is provided with driving motor means drivingly coupled with respect thereto for driving same when desired.

In the specific example illustrated, said driving motor means is generally indicated at 52 and comprises water wheel or water-powered turbine motor means having a multiple bladed rotor 53 positioned within an outer housing 54 and adapted to have a jet of water impinge against said multiple bladed rotor 53 in a tangential direction as a result of the forcible introduction of water thereinto through injection pipe means 55 which is connected through control valve means 56 to the water inflow conduit means 26. Thus a water jet injected into the water wheel means 52 by said injection pipe 55, will strike the multiple bladed rotor 53 and will cause it to rotate, after which said excess water will be emitted through an aperture 57 into the interior of said second chamber 23. Said water wheel means 52 has a shaft 58 which carries a first pulley sheave 59 which drives a pulley belt 61 which engages a second pulley sheave 62 which drives the hereinbefore-mentioned auxiliary pump 39.

It will be readily understood that when the valve 56 is closed the water wheel means 52 will cease to rotate and will cease to drive the pump 39. On the other hand, partial closure of the valve 56 will merely control the speed of operation of the water wheel means 52.

It should be noted that the water wheel form of driving motor means 52 best illustrated in FIGS. 1, 2, and 4 is exemplary only and is not to be construed as specifically limiting the invention. Actually, driving electric motor means (or various other types of motor means) may be employed in lieu thereof, if desired, in which case a control switch means may be employed in lieu of the control valve 56 for controlling the operation of said driving motor means. Such an arrangement is illustrated fragmentarily in FIG. 8 and the modified driving motor means is indicated by the reference numeral 52' and said control switch means is indicated by the reference numeral 56'.

FIG. 6 merely illustrates a typical one of the control valve means for controlling flow through various of the inlet and outlet conduit and/or duct means, in this case comprising the valve 49A, although it is exemplary of various of the other valves also. In will be noted that, in this exemplary form of the invention, the outlet conduit means 34 is of a flexible type, such as plastic tubing or the like, and the valve means actually comprises a manually rotatable valve member 63 having an exteriorly threaded lower portion 64 threadedly engaging an interiorly threaded portion 65 of the member 66 whereby rotation of the valve member 63 will cause the lower flat abutting end portion 67 of the valve member 63 to either advance or retract with respect to the flexible outlet conduit means 34 in the manner best shown in FIG. 6. When it is advanced downwardly, it effectively reduces the interior cross-sectional area of the flexible outlet conduit means 34 to any desired degree and may, in fact, completely close said conduit 34, if desired. On the other hand, threaded upward movement of the valve member 63 releases the compression from the flexible conduit 34 and allows it to open up and effectively increase its interior cross-sectional area to the full maximum as determined by the position of the rotary valve member 63.

It should be noted that the main pump 32 is provided with a motor 68 which is shown as comprising an electric motor adapted to be supplied with suitable electric power through input lead means 69 by way of a clock type controller 71 which may be set so as to cause the motor to be energized only at certain stated periods of time and to be de-energized at other periods of time. For example, the clock type controller 71 may be arranged to de-energize the motor 68 at night and may be arranged to re-energize the motor 68 at certain periods during daylight hours, as desired. However, the invention is not limited by these features of the drawings.

The inlet conduit means 24 and/or the first chamber 22 is effectively provided with inflow-controlling float valve means, as indicated generally at 72, while said inflow conduit means 26 and/or said second chamber 23 are also effectively provided with inflow-controlling float valve means 73.

Each of said inflow controlling float valves 72 and 73 is cooperable to be closed when the liquid therein, such as shown at 37 or 38, respectively, rises to a predetermined upper maximum level, such as indicated at 74 in the case of a liquid 37 and such as indicated at 75 in the case of the liquid 38, and each of said float valves 72 and 73 is adapted to be opened in response to the dropping of the corresponding ones of said liquid levels below said predetermined upper maximum level, as shown at 74 and 75 in FIG. 4, by a predetermined amount. This will have the effect of causing the two liquids 37 and 38 to flow into the two chambers 22 and 23 until they reach said upper maximum levels 74 and 75 when said float valves 72 and 73 cut off said inflow.

It will be noted that in the case of the float valve 72, it merely comprises a light float valve member 76 of spherical configuration which is adapted to seat against the open bottom end 77 of the inflow conduit means 24. On the other hand, the other float valve means 73 comprises a large hollow float member 78 which has an effective average density less than water and which is slidably mounted on the upwardly extending hollow pipe 79 and which is coupled by a linkage member 81 to an operating member 82 connected to the valve 83 carried at the top of the pipe 79 which has its lower end in communication with the inflow conduit means 26. Thus, the vertical position of the float 78 controls the opening or closing of the valve 83.

In the exemplary form of the invention illustrated, said first and second chambers 22 and 23 are also provided with outflow-controlling float valve means, indicated generally at 84 and 85, cooperable for closure of the outlet conduit means 34 and 35, respectively, in response to outflow of the corresponding liquid 37 or 38, respectively, from the corresponding chamber 22 or 23, respectively, to a predetermined lower minimum level such as indicated in broken lines at 86 and 87, respectively. Obviously, upon the rising of the liquid from said predetermined minimum lower levels 86 and 87, the float valves 84 and 85, respectively, will effectively open.

In the exemplary form of the invention illustrated, said float valve 84 actually comprises the previously mentioned float member 76 and an upwardly directed apertured end portion 88 of the outlet conduit means 34 which is adapted to sealingly engage the float member 76 when it rests thereon as a result of the liquid falling to the predetermined minimum level indicated at 86. The other float valve 85 is of similar construction also comprises a light float valve member 89 which is adapted to rest upon an apertured valve seat member 91 at the upper end of the outlet conduit means 35 when the water 38 falls to the predetermined minimum level indicated at 87 whereby to seal said valve means 85. Said inlet and outlet float valves 72 and 84 are provided with a common slotted hollow cylindrical guide member 92 for guiding the spherical float member 76, and the other float valve 85 is provided with a similar slotted hollow cylindrical guide member 93 for the same purpose.

The second chamber 23 may be provided with measuring means for measuring the acidity and/or the chlorine content of the swmming pool water, if desired. Such an acidity measuring device is indicated generally at 94, while such a chlorine measuring device is indicated generally at 95 and each is provided with inlet tube means 96 and 97, respectively, extending upwardly to inlet receiving cup means 98 and 99, respectively, for the reception of corresponding testing reagents and/or solutions as shown in the twin dispensing botles indicated at 100 and carried in the side wall mounted holder 101 for convenience. However, various other arrangements may be provided.

The entire chlorinator 21 is preferably made of non-corrodable materials, such as plastics or the like, although various other suitable materials may be employed in lieu thereof.

It should be understood that the figures and the specific description thereof set forth in this application are for the purpose of illustrating the present invention and are not to be construed as limiting the present invention to the precise and detailed specific structure shown in the figures and specificially described hereinbefore. Rather, the real invention is intended to include substantially equivalent constructions embodying the basic teachings and inventive concept of the present invention.

I claim:

1. Liquid additive apparatus for adding a first liquid to a second liquid in a desired ratio, comprising: housing means defining first and second chamber means, said first chamber means being provided with inflow conduit means thereinto adapted to be connected to supply means for a first additive liquid which is to be added to a second liquid, said second chamber means being provided with inflow conduit means adapted to be supplied with said second liquid, said first and second chamber means being provided with outflow conduit means and common outflow duct means connected thereto and adapted to be connected with respect to pumping means and closed-loop hydraulic circuit means for effectively pumping said first and second liquids through said common outflow duct means and said closed loop hydraulic circuit; ratio-controlling means for controlling the ratio of said first and second liquids drawn from said first and second chamber means through said outflow conduit means thereof into said common outflow duct means, said ratio-controlling means comprising controllably adjustable metering valve means effectively connected between said first chamber means and said common outflow duct means in said flow path from said first chamber means through said outflow conduit means thereof; and pumping means comprising an auxiliary pump having inflow and outflow sides and a main pump having a low pressure suction inlet side and a high pressure outlet side adapted to be connected in a closed-loop hydraulic circuit means for circulating the mixture of said first and second liquids, with said inflow side of said auxiliary pump being connected to said common outflow duct means and with said outflow side thereof being connected to said outlet side of said main pump whereby to effectively connect said liquid additive apparatus in parallel to a portion of said closed-loop hydraulic circuit means and the mixture of said first and second liquids forcibly circulated therein by said main pump.

2. Liquid additive apparatus for adding a first liquid to a second liquid in a desired ratio, comprising: housing means defining first and second chamber means, said first chamber means being provided with inflow conduit means thereinto adapted to be connected to supply means for a first additive liquid which is to be added to a second liquid, said second chamber means being provided with inflow conduit means adapted to be supplied with said second liquid, said first and second chamber means being provided with outflow conduit means and common outflow duct means connected thereto and adapted to be connected with respect to pumping means and closed-loop hydraulic circuit means for effectively pumping said first and second liquids through said common outflow duct means and said closed loop hydraulic circuit; ratio-controlling means for controlling the ratio of said first and second liquids drawn from said first and second chamber means through said outflow conduit means thereof into said common outflow duct means, said ratio-controlling means comprising controllably adjustable metering valve means effectively connected between said first chamber means and said common outflow duct means in the flow path from said first chamber means through said outflow conduit means thereof; a closed-loop hydraulic circuit means; and pumping means comprising an auxiliary pump having inflow and outflow sides and a main pump having a low pressure suction inlet side and a high pressure outlet side connected in said closed-loop hydraulic circuit means for circulating the mixture of said first and second liquids, with said inflow side of said auxiliary pump being connected to said common outflow duct means and with said outflow side thereof being connected to said outlet side of said main pump whereby to effectively connect said liquid additive apparatus in parallel to a portion of said closed-loop hydraulic circuit means and the mixture of said first and second liquids forcibly circulated therein by said main pump, with said inlet side of said main pump also being controllably connected to said common outflow duct means in parallel with said auxiliary pump.

3. Liquid additive apparatus for adding a first liquid to a second liquid in a desired ratio, comprising: housing means defining first and second chamber means, said first chamber means being provided with inflow conduit means thereinto adapted to be connected to supply means for a first additive liquid which is to be added to a second liquid, said second chamber means being provided with inflow conduit means adapted to be supplied with said second liquid, said first and second chamber means being provided with outflow conduit means and common outflow duct means connected thereto and adapted to be connected with respect to pumping means and closed-loop hydraulic circuit means for effectively pumping said first and second liquids through said common outflow duct means and said closed loop hydraulic circuit; ratio-controlling means for controlling the ratio of said first and second liquids drawn from said first and second chamber means through said outflow conduit means thereof into said common outflow duct means, said ratio-controlling means comprising controllably adjustable metering valve means effectively connected between said first chamber means and said common outflow duct means in the flow path from said first chamber means through said outflow conduit means thereof; and pumping means comprising an auxiliary pump having inflow and outflow sides and a main pump having a low pressure suction inlet side and a high pressure outlet side adapted to be connected in a closed-loop hydraulic circuit means for circulating the mixture of said first and second liquids, with said inflow side of said auxiliary pump being connected to said common outflow duct means and with said outflow side thereof being adapted to be connected to said outlet side of said main pump whereby to effectively connect said liquid additive apparatus in parallel to a portion of said closed-loop hydraulic circuit means and the mixture of said first and second liquids forcibly circulated therein by said main pump; and driving motor means drivingly coupled with respect to said auxiliary pump for driving same.

4. Liquid additive apparatus for adding a first liquid to a second liquid in a desired ratio, comprising: housing means defining first and second chamber means, said first chamber means being provided with inflow conduit means thereinto adapted to be connected to supply means for a first additive liquid which is to be added to a second liquid, said second chamber means being provided with inflow conduit means adapted to be supplied with said second liquid, said first and second chamber means being provided with outflow conduit means and common outflow duct means connected thereto and adapted to be connected with respect to pumping means and closed-loop hydraulic circuit means for effectively pumping said first and second liquids through said common outflow duct means and said closed loop hydraulic circuit; ratio-controlling means for controlling the ratio of said first and second liquids drawn from said first and second chamber means through said outflow conduit means thereof into said common outflow duct means, said ratio-controlling means comprising controllably adjustable metering valve means effectively connected between said first chamber means and said common outflow duct means in the flow path from said first chamber means through said outflow conduit means thereof; and pumping means comprising an auxiliary pump having inflow and outflow sides and a main pump having a low pressure suction inlet side and a high pressure outlet side adapted to be connected in a closed-loop hydraulic circuit means for circulating the mixture of said first and second liquids, with said inflow side of said auxiliary pump being connected to said common outflow duct means and with said outflow side thereof being adapted to be connected to said outlet side of said main pump whereby to effectively connect said liquid additive apparatus in parallel to a portion of said closed-loop hydraulic circuit means and the mixture of said first and second liquids forcibly circulated therein by said main pump; driving, liquid-powered, motor means drivingly coupled with respect to said auxiliary pump for driving same; and means for coupling said inflow conduit means of said second chamber means, and said second liquid flowing therein, with respect to said liquid-powered motor means for rotating same.

5. Liquid additive apparatus for adding a first liquid to a second liquid in a desired ratio, comprising: housing means defining first and second chamber means, said first chamber means being provided with inflow conduit means thereinto adapted to be connected to supply means for a first additive liquid which is to be added to a second liquid, said second chamber means being provided with inflow conduit means adapted to be supplied with said second liquid, said first and second chamber means being provided with outflow conduit means and common outflow duct means connected thereto and adapted to be connected with respect to pumping means and closed-loop hydraulic circuit means for effectively pumping said first and second liquids through said common outflow duct means and said closed loop hydraulic circuit; ratio-controlling means for controlling the ratio of said first and second liquids drawn from said first and second chamber means through said outflow conduit means thereof into said common outflow duct means, said ratio-controlling means comprising controllably adjustable metering valve means effectively connected between said first chamber means and said common outflow duct means in the flow path from said first chamber means through said outflow conduit means thereof; and pumping means comprising an auxiliary pump having inflow and outflow sides and a main pump having a low pressure suction inlet side and a high pressure outlet side adapted to be connected in a closed-loop hydraulic circuit means for circulating the mixture of said first and second liquids, with said inflow side of said auxiliary pump being connected to said common outflow duct means and with said outflow side thereof being adapted to be connected to said outlet side of said main pump whereby to effectively connect said liquid additive apparatus in parallel to a portion of said closed-loop hydraulic circuit means and the mixture of said first and second liquids forcibly circulated therein by said main pump; and driving electric motor means drivingly coupled with respect to said auxiliary pump for driving same.

6. Liquid additive apparatus for adding a first liquid to a second liquid in a desired ratio, comprising: housing means defining first and second chamber means, said first chamber means being provided with inflow conduit means thereinto adapted to be connected to supply means for a first additive liquid which is to be added to a second liquid, said second chamber means being provided with inflow conduit means adapted to be supplied with said second liquid, said first and second chamber means being provided with outflow conduit means and common outflow duct means connected thereto and adapted to be connected with respect to pumping means and closed-loop hydraulic circuit means for effectively pumping said first and second liquids through said common outflow duct means and said closed loop hydraulic circuit; ratio-controlling means for controlling the ratio of said first and second liquids drawn from said first and second chamber means through said outflow conduit means thereof into said common outflow duct means, said ratio-controlling means comprising controllably adjustable metering valve means effectively connected between said first chamber means and said common outflow duct means in the flow path from said first chamber means through said outflow conduit means thereof; a closed-loop hydraulic circuit means; and pumping means comprising an auxiliary pump having inflow and outflow sides and a main pump having a low pressure suction inlet side and a high pressure outlet side connected in said closed-loop hydraulic circuit means for circulating the mixture of said first and second liquids, with said inflow side of said auxiliary pump being connected to said common outflow duct means and with said outflow side thereof being connected to said outlet side of said main pump whereby to effectively connect said liquid additive apparatus in parallel to a portion of said closed-loop hydraulic circuit means and the mixture of said first and second liquids forcibly circulated therein by said main pump, with said inlet side of said main pump also being controllably connected to said common outflow duct means in parallel with said auxiliary pump; and control valve means effectively positioned between said outflow side of said auxiliary pump and said outlet side of said main pump and additional control valve means positioned between said common outflow duct means and said inlet side of said main pump for controlled routing of the flow of the mixed first and second liquids to the desired side of said main pump.

References Cited by the Examiner

UNITED STATES PATENTS

| | | | |
|---|---|---|---|
| 646,108 | 3/00 | Kennicott | 137—99 X |
| 1,183,513 | 5/16 | Ahola | 137—391 X |
| 1,936,538 | 11/33 | Borden | 137—571 X |
| 2,808,934 | 10/57 | Rivas | 210—198 X |
| 2,820,701 | 1/58 | Leslie | 210—169 X |
| 3,072,134 | 1/63 | Williamson | 137—114 |
| 3,096,780 | 7/63 | Kane | 137—599.1 X |

MARTIN P. SCHWADRON, *Acting Primary Examiner.*

M. CARY NELSON, *Examiner.*